(12) United States Patent
Hori et al.

(10) Patent No.: US 7,733,746 B2
(45) Date of Patent: Jun. 8, 2010

(54) PLAYBACK DEVICE

(75) Inventors: Naoki Hori, Osaka (JP); Norio Hatanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 553 days.

(21) Appl. No.: 10/574,345

(22) PCT Filed: Oct. 4, 2004

(86) PCT No.: PCT/JP2004/014980

§ 371 (c)(1),
(2), (4) Date: Apr. 3, 2006

(87) PCT Pub. No.: WO2005/034121

PCT Pub. Date: Apr. 14, 2005

(65) Prior Publication Data

US 2007/0130418 A1    Jun. 7, 2007

(30) Foreign Application Priority Data

Oct. 3, 2003   (JP) .............................. 2003-345417

(51) Int. Cl.
*G11B 7/004* (2006.01)
(52) U.S. Cl. ............... 369/30.23; 369/47.33; 369/47.34
(58) Field of Classification Search ........................ None
See application file for complete search history.

(56) References Cited

U.S. PATENT DOCUMENTS

2001/0003552 A1   6/2001 Yamamoto
2001/0013269 A1*  8/2001 Tanji ............................ 84/601
2001/0038032 A1* 11/2001 Kang et al. .................. 235/375
2002/0012297 A1*  1/2002 Suzuki ........................ 369/47.3
2003/0131713 A1   7/2003 Haruyama et al.
2003/0210617 A1* 11/2003 Millikan et al. .......... 369/30.23
2006/0013088 A1*  1/2006 Fontijn et al. ............. 369/47.32

FOREIGN PATENT DOCUMENTS

| JP | 8-221317    | 8/1996 |
| JP | 2001-176247 | 6/2001 |
| JP | 2001-218165 | 8/2001 |
| JP | 2003-208168 | 7/2003 |
| JP | 2003-272302 | 9/2003 |

OTHER PUBLICATIONS

Machine translation of JP2000-222825 A into English, Hatanaka et al.*

* cited by examiner

*Primary Examiner*—Wayne R Young
*Assistant Examiner*—Brian Butcher
(74) *Attorney, Agent, or Firm*—McDermott Will & Emery LLP

(57) ABSTRACT

Disclosed is a playback device capable of audio playback with little or no interruption. Yet, there is no need of increasing the memory capacity of the playback device and sacrificing the usability of the playback device. The playback device stores, to its internal memory, identification information of audio data stored on a recording medium such as an optical disc, and specifying information specifying the storage location of the identification information. The playback device sequentially stores the audio data to a remaining area of the memory. The audio data stored in the memory is supplied for playback.

18 Claims, 12 Drawing Sheets

FIG.3A

| FILE NUMBER | FILE NAME LENGTH | STORAGE START ADDRESS |
|---|---|---|
| 1 | 25 | 0 |
| 2 | 16 | 25 |
| . | . | . |
| . | . | . |
| . | . | . |
| N | 32 | M |

FIG.3B

| U | T | A | D | A | _ | H | I | K | A | R | U | _ | D | I | S |
|---|---|---|---|---|---|---|---|---|---|---|---|---|---|---|---|
| T | A | N | C | E | . | m | p | 3 | B | E | A | T | L | E | S |
| _ | H | E | L | P | . | m | p | 3 | | | | | | | |
| | | | | | ⋮ | | | | | | | | | | |
| F | U | K | U | Y | A | M | A | _ | M | A | S | A | H | A | R |
| U | _ | S | A | K | U | R | A | Z | A | K | A | . | m | p | 3 |

PLAYBACK DEVICE

RELATED APPLICATION

This application is a national phase of PCT/JP2004/014980 filed on Oct. 4, 2004, which claims priority from Japanese Application No. 2003-345417 filed on Oct. 3, 2003, the disclosures of which Applications are incorporated by reference herein. The benefit of the filing and priority dates of the International and Japanese Applications is respectfully requested.

TECHNICAL FIELD

The present invention relates to a memory usage technology for audio players and the like. More particularly, the present invention relates to a memory usage technology relating to playback of audio data read from a removable disc, such as an optical disc.

BACKGROUND ART

With the recent advancement of compression techniques of audio data such as music data, removable media including optical discs (hereinafter, simply "recording media") can now store audio data corresponding to a lot of songs. Examples of the audio data compression techniques include MP3 (MPEG-1 Audiolayer-III) and WMA (Windows Media Audio). With the increase in the number of songs a recording medium can hold, some functions are becoming increasingly common. One example is a function of displaying information about the songs stored on the recording medium.

More specifically, with such a function, a list of the titles of songs stored on the recording medium is displayed, so that a user is allowed to select a song from the list for playback.

At the time when a recording medium is loaded in a playback device, the playback device reads and stores necessary data from a recording medium to its internal memory in advance, in order to display a list of songs stored on the recording medium or to play back of a song immediately upon a user request (For details, see the "Comparative Study with Conventional Playback Technology" section provided below). Also, there is disclosed a technique of checking such a playback device for memory corruption (JP patent application publication No. 2003-15963).

In addition, with the prevalence of portable devices capable of storing and playing audio data such as music, it is common to load a recording medium storing numerous songs in a portable device and plays back music, while carrying the device around.

During playback of music with a playback device being carried around, the playback device may momentary fail to read audio data from a recording medium because of shock or vibration given to the playback device. In view of such possibilities, audio data is read ahead into a memory of the playback device and the audio data is supplied from the memory for playback. This arrangement helps to play back audio data without skip or interruption (For details, see the "Comparative Study with Conventional Playback Technology" section provided below).

However, with increase in the amount of audio data such as music stored on a recording medium, the memory of the playback device is required to store a larger amount of data in order to display a list of stored music. Since the capacity of the memory is limited, a less area is allocated for storing read-ahead music data. This increases the possibility that audio playback gets interrupted.

Yet, by allocating a larger memory area to store audio data for the purpose of ensuring seamless audio playback, the playback device display may fail to display a list of songs or take relatively a long time before playback of a requested song starts. Such a playback device is poor in usability and practicability.

Yet, increasing the memory capacity will lead to increase the cost of playback device.

DISCLOSURE OF THE INVENTION

In view of the above, the present invention aims to provide a playback device capable of audio playback with little or no interruption, without increasing the memory capacity and impairing the usability of the playback device.

In order to achieve the above aim, the present invention provides a playback device having a storage unit. The playback device includes a playback unit operable to play back audio data stored in the storage unit; and a control unit operable to store, in the storage unit, identification information of the audio data and specifying information specifying a storage location of the identification information, and sequentially store the audio data for playback in a remaining area of the storage unit.

With the above structure, when storing identification information and other information of the audio data to the storage unit, the playback device of the present invention leaves no or little wasted space. Thus, the amount of the information is reduced to a minimum. Thus, there is more space available for storing the audio data.

Specifically, for example, when storing the identification information into fixed length fields of 32 bytes, there will be wasted space left if the identification information is less than 32 bytes.

According to the playback device stated above, such wasted space is used to increase the area for storing audio data.

This arrangement decreases undesirable possibility of skip or interruption of audio playback, without sacrificing the usability of the playback device.

In addition, the playback device stated above is capable of storing a greater amount of identification information and other information as compared with a conventional playback device. Thus, the usability of the playback device improves.

In addition, even if the identification information exceeds 32 bytes, the file name represented by the identification information is fully stored without losing any part of the file name.

Here, the playback device may further include: an audio data reading unit operable to read the audio data from a recording medium that is loaded in the playback device and contains a plurality of pieces of audio data and a plurality of pieces of identification information of the respective pieces of the audio data; an identification information reading unit operable to read the identification information from the recording medium; and a designating unit operable to designate, from among the plurality of pieces of audio data, a piece of audio data for playback. The control unit may be operable to generate the specification information based on the identification information read by the identification information reading unit, and after storing the identification information and the specifying information to the storage unit, cause the audio data reading unit to read part of the designated piece of audio data, and store the read part to the storage unit.

Here, the control unit may be operable to control the audio data reading unit, so that the audio data is sequentially read ahead of a current playback point and stored to the storage unit prior to playback by the playback unit.

With the structures stated above, each time a recording medium is loaded, the playback device newly reads identification information and other information from the recording medium and stores the read information to the storage unit. When a recording medium currently loaded contains a relatively small number of pieces of music data and identification information, a smaller area of the storage unit is required for storing the identification information. Thus, a larger amount of read-ahead audio data can be held in the storage unit.

Here, when any piece of the identification information exceeds a predetermined length, the control unit may be operable to store the piece of identification information reduced to the predetermined length.

Here, the control unit may be operable to store the identification information and the specifying information in a limited amount not occupying a storage capacity of the storage unit exceeding a predetermined percentage.

With the structures stated above, when storing identification information of audio data stored on the recording medium, the playback device is capable of limiting the total size of identification information to a predetermined size or smaller. Thus, it is ensured that a certain size of area of the storage unit is reserved for audio data storage.

By employing the memory usage of the present invention, an optical disc playback device automatically optimizes a memory area for storing file management information which is notably memory consuming. Furthermore, a memory area made available by the optimization is automatically and additionally reserved for storing audio data. Thus, the audio data storage area is effectively reserved. As a result, increase in cost is avoided since increase in the memory capacity is not necessary.

Especially to be noted is that the area used to store file names is variable in size in accordance with the total size of the file names stored therein. Thus, as compared with the case where file names are stored as fixed length data and the file names include ones extremely shorter and ones slightly longer than the fixed length, the total amount of memory used is significantly reduced.

In addition, if file names are stored as fixed length data, data of the fixed length needs to be fetched to read a file name, which involves waste. According to the present invention, however, each file name is stored as variable-length data along with the length of the file name. Thus, each file name is read at a higher speed since the length of data that needs to be fetched is the actual length of the file name.

BRIEF DESCRIPTION OF THE DRAWINGS

FIG. 3A shows an example of the structure and contents of a management information table 2000, and FIG. 3B shows an example of the structure and contents of file name data 3000;

FIG. 6A shows an example in which a management information area 1520 of the disc information storage unit 1500 is re-defined to be smaller, whereas

BEST MODE FOR CARRYING OUT THE INVENTION

<Overview>

A playback device according to the present invention dynamically minimizes the amount of data necessary for displaying a list of audio data, for example. Thus, without the need to change the memory capacity of the playback device, the playback device dynamically increases and decreases a storage area used for storing audio data. With this arrangement, the playback device is enabled to effectively suppress occurrences of skip or interruption during audio playback.

Hereinafter, a description is given to an embodiment of a playback device according to the present invention.

In this embodiment, a playback device for optical discs is taken as an example. In addition, an optical disc subjected to playback stores a plurality of songs and titles of the songs, along with other data.

<Structure>

Figure 1:
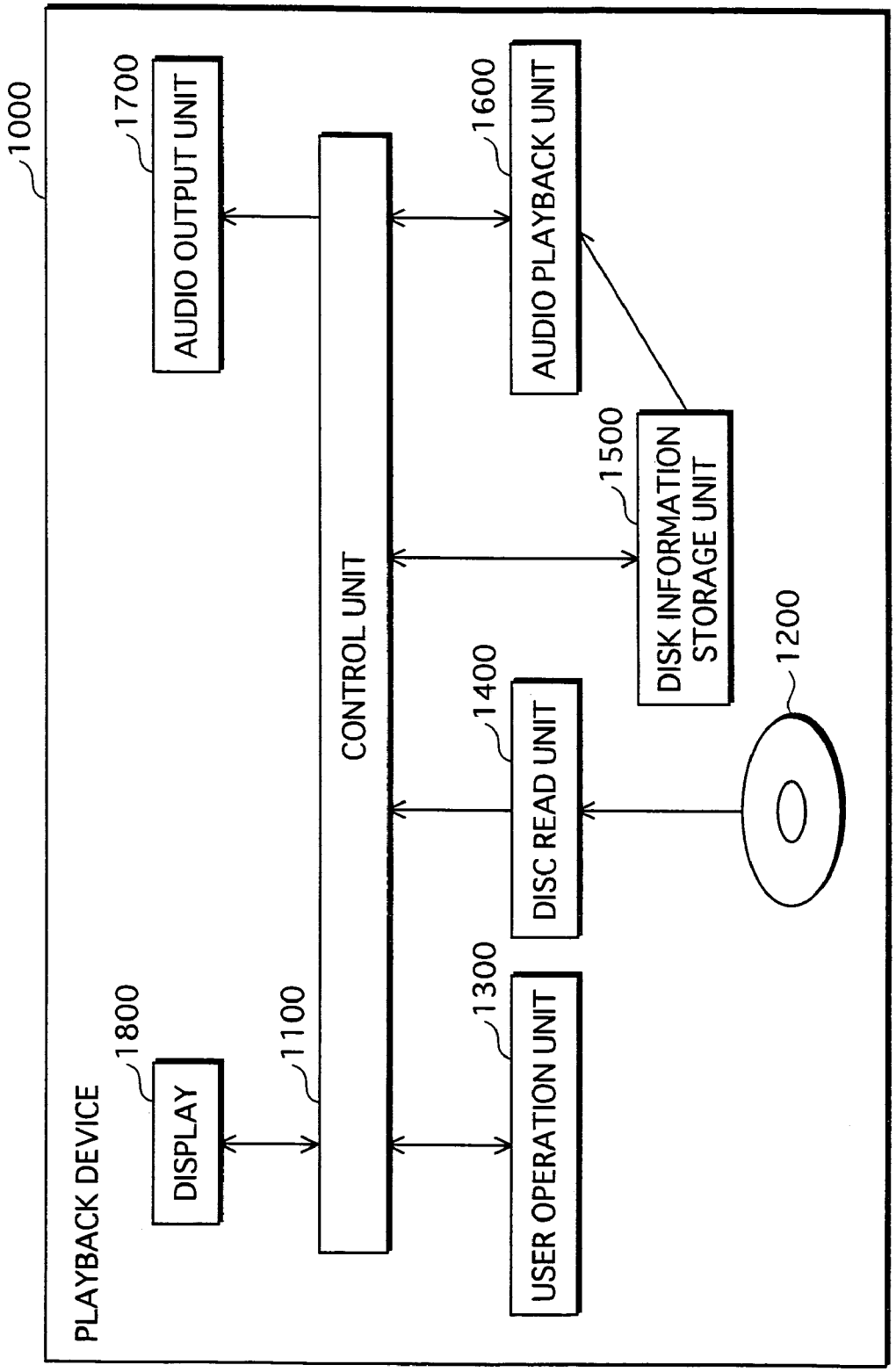
FIG. 1 is a block diagram of the structure of a playback device according to the present invention.

FIG. 1 is a block diagram of the structure of the playback device according to the present invention.

The playback device 1000 is composed of a control unit 1100, an optical disc 1200, a user operation unit 1300, a disc read unit 1400, a disc information storage unit 1500, an audio playback unit 1600, an audio output unit 1700, and a display 1800.

In addition to the functions of ordinal playback devices, the control unit 1100 has controlling functions specific to the present invention. The functions of ordinal playback devices include an error detection function and a motor control function performed at the time of reading the optical disc 1200, which will be described later. For the details of such operation control, see the "Comparative Study with Conventional Playback Technology" section provided below.

The user operation unit 1300 has a function of receiving various user instructions, including an instruction requesting display of a list of song titles stored on the optical disc 1200, and an instruction requesting playback of a specific song.

Figure 7:
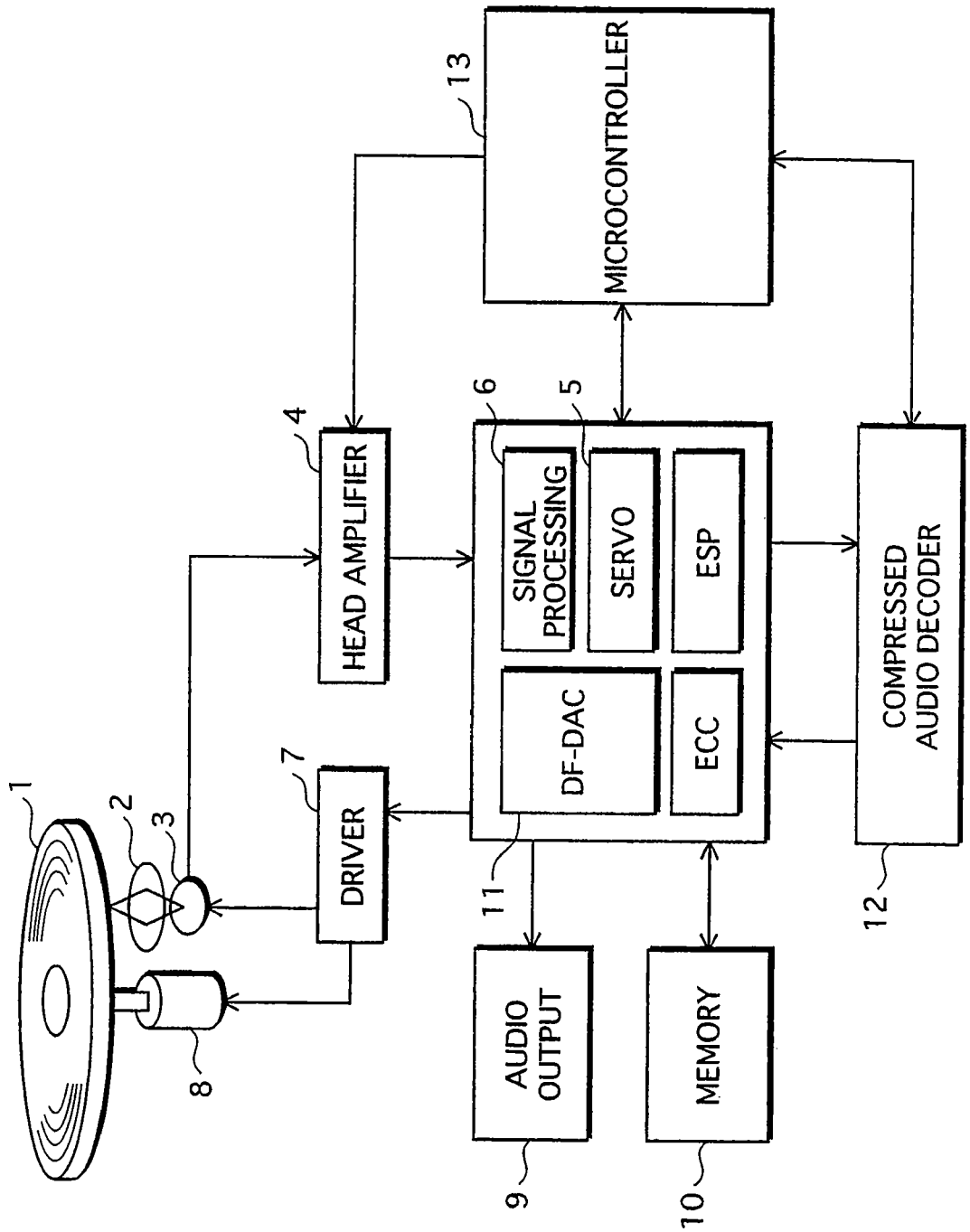
FIG. 7 is a block diagram of a conventional optical disc playback device.

The disc read unit 1400 has a function of irradiating the optical disc 1200 with a laser and converting light reflected off the optical disc 1200 into an electric signal. (See the "Comparative Study with Conventional Playback Technology" section provided below. In FIG. 7, the components from a lens 2 to a spindle motor 8 collectively correspond to the disc read unit 1400.)

The disc information storage unit 1500 has a function of storing disc information including, along with variety of other information, the song titles stored on the optical disc 1200. The disc information is read from the optical disc 1200 and stored into the disc information storage unit 1500 in response to an instruction issued by the control unit 1100 upon detecting that the optical disc 1200 is loaded in the playback device 1000. Consequently, when a different disc is loaded, a different set of disc information is stored to the disc information storage unit 1500.

In addition, the disc information storage unit 1500 has a function of storing part of audio data. Basically, the audio data is sequentially read ahead and updated during playback. Note that in this embodiment, the audio data refers to data representing songs and music.

The disc information storage unit 1500 has a storage capacity determined differently in view of, for example, a use of the playback device. If the playback device is expected to be used mainly while being carried around, the storage capacity of 16 megabits is sufficient. On the other hand, if the playback device is of a stationary type and not expected to experience much vibration, the storage capacity of 1 megabit is sufficient.

In addition, the disc information storage unit 1500 may be implemented by a memory capable of read and write at a relatively high seeped. For example, DRAM (Dynamic Random Access Memory), SRAM (Static Random Access Memory) or FPRAM (FeRAM) maybe used.

The audio playback unit 1600 has a function of reading audio data from the disc information storage unit 1500 and digital-to-analog converting the read audio data. (For details, see the "Comparative Study with Conventional Playback Technology" section provided below. In FIG. 7, a DF-DAC circuit mainly corresponds to the audio playback unit 1600).

The audio output unit 1700 is so-called a speaker, and has a function of outputting audio playback.

The display 1800 has a function of displaying a list of songs and other information.

The functions of the playback device 1000 are implemented partly by a computer (not illustrated) executing a program stored in a respective memory or hard disk (not illustrated).

<Data>

Hereinafter, a description is given to main data manipulated by the playback device 1000, with reference to FIGS. 2 and 3.

Figure 2:
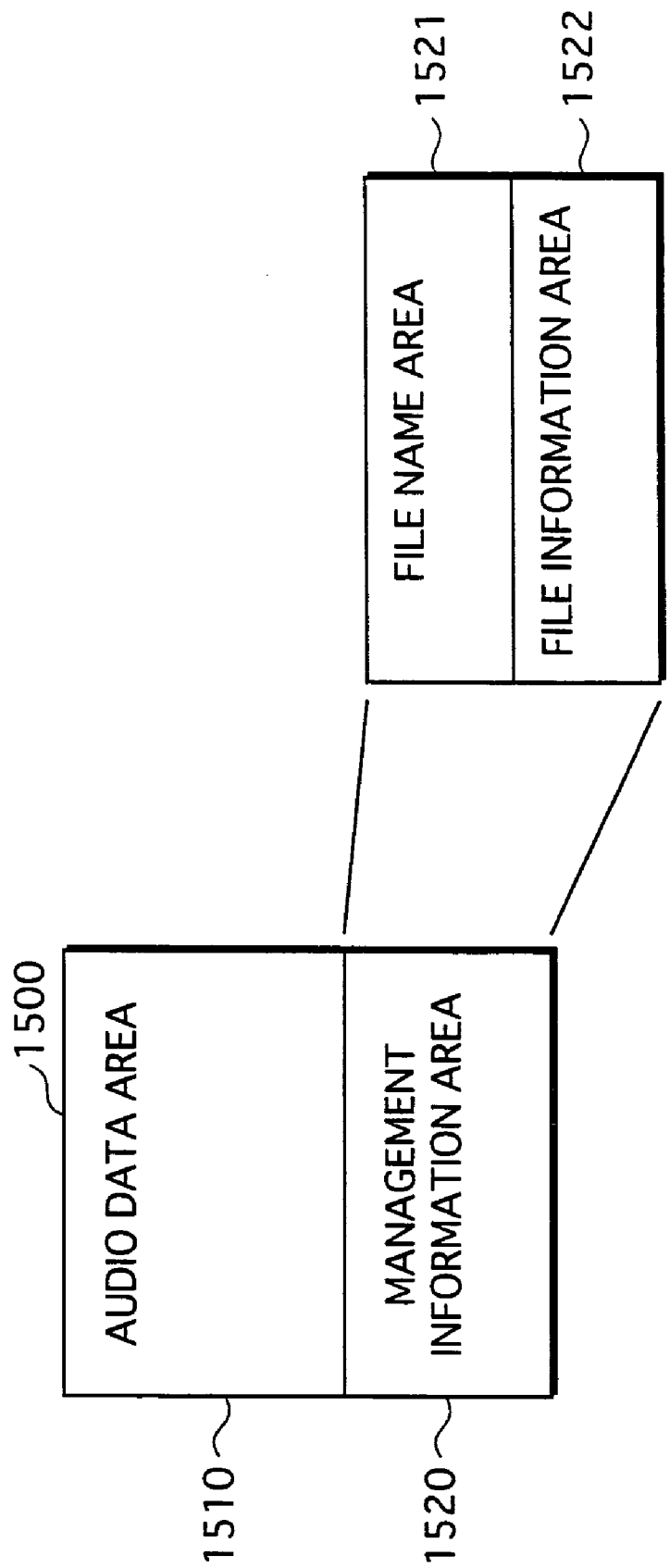
FIG. 2 shows an example configuration of a disc information storage unit 1500.

FIG. 2 shows an example configuration of the disc information storage unit 1500. A description of the contents stored in the disc information storage unit 1500 will be described with reference to FIGS. 3A and 3B.

The disc information storage unit 1500 is partitioned into two areas for separately storing different types of data.

One of the areas is an audio data area 1510 for storing audio data. The other area is a management information area 1520 for storing information used for managing audio data stored on the optical disc 1200. In this embodiment, a file name represents a song title.

The management information area 1520 is further partitioned into two areas. One is a file name area 1521 for storing the file names (i.e. song titles) stored on the optical disc 1200. The other area is a file information area 1522 for storing information relating to the file names stored in the file name area 1521, such as file name length, as well as information relating to each file, such as the start address of each file on the disc.

The disc information storage unit 1500 is fixed in storage size. Yet, both the audio data area 1510 and the management information area 1520 are variable in storage size, in accordance with the contents of the optical disc 1200 loaded in the playback device 1000.

More specifically, the size of the management information area 1520 is increased or decreased in accordance with such a factor as the number of songs stored on the optical disc 1200. In compliance with the increase or decrease of the management information area 1520, the size of the audio data area 1510 is increased or decreased, so that the total of the audio data area 1510 and the management information area 1520 equals in size to the disc information storage unit 1500.

Yet, once determined when the optical disc 1200 is loaded in the playback device 1000, the sizes of those areas remain the same until another optical disk is loaded.

FIG. 3A shows an example of the structure and contents of a management information table 2000. FIG. 3B shows an example of the structure and contents of file name data 3000.

First, a description is given to the management information table 2000 shown in FIG. 3A.

The management information table 2000 is stored in the file information area 1522. As mentioned above, the file information area 1522 also stores information relating to pieces of audio data corresponding to the respective file names, including the start and end addresses of each piece of audio data on the disc.

The file information area 1522 has a fixed size and stores information relating to a predetermined number of files. Each data item is stored in correspondence with one of file numbers sequentially assigned to the respective files and has a predetermined data length and storage location.

The management information table 2000 is composed of a file number column 2100, a file name length column 2200, and a start address column 2300.

The file number column 2100 contains file numbers each identifying one of the files. The various data items are stored in, for example, the file name length column 2200 and the start address column 2300, in association with a corresponding identification number. There is another table storing the storage location of each file's audio data on the disc, in association with a corresponding identification number. In the example shown in the figure, the file numbers range from "1" through "N". The number "N" is the maximum number of files that the playback device 1000 can manage. In one example, the playback device 1000 can manage up to 512,256 files.

The file name length column 2200 contains file name lengths each showing the length of a respective file name in bytes.

In the present embodiment, each file name is 32 bytes at the maximum. This byte length is determined for the convenience sake of displaying a file name list by the playback device 1000.

The start address column 2300 contains start addresses each showing the beginning of the storage location of a respective one of the file names in the file name data 3000. That is, each start address shows the number of offset bytes from the beginning of the file name data 3000 to the storage location of a respective file name.

Note that in the case where the number of files recorded on the optical disc 1200 is smaller than "N", the management information table 2000 contains the file name lengths and start addresses that correspond to no file and thus hold the value of "0".

That is, according to the present embodiment, the management information table 2000 has a fixed size and the file information area 1522 also has a fixed size.

Suppose, for example, each data item contained in the file number column 2100, the file name length column 2200, and the start address column 2300 takes up two bytes and the maximum file number "N" is "512". In this case, the size of the management information table 2000 is calculated to be 3,072 bytes.

Next, a description is given to the file name data 3000 shown in FIG. 3B.

The file name data 3000 is stored in the file name area 1521.

The file name area 1521 stores a contiguous sequence of file names from the beginning, without any symbols or characters for delimiting the file names.

That it to say, the size of the file name data 3000 increases or decreases, in accordance with the number of files and the lengths of the stored file names.

For example, in the file management information table 2000, it is shown that the file name associated with the file number "2" has the start address "25" and the file name length "16". This means that the file name identified by the file number "2" starts at the 25$^{th}$ byte from the beginning of the file name data 3000 and the length is 16 bytes. Thus, it is shown in the file name data 3000 that the file name identified by the file number "2" is "BEATLES_HELP.mp3".

As described above, each file name has a length shown in the file name length column 2200 of the management information table 2000 and stored at a location shown in the start address column 2300 also of the management information table 2000. Thus, by referring to the management information table 2000, the storage location of a specific file name in the file name data 3000 is readily specified even if the lengths of the file names differ one from another.

With this arrangement, it is allowed to reduce redundant or space areas that are inevitably present in the case of storing fixed-length file names. Thus, the size of the file name area 1521 is reduced as compared with the case of storing fixed-length file names. Still, the variable-length file names are accurately read by managing the length, start address, and possibly end address of each file name.

<Operations>

Figure 4:
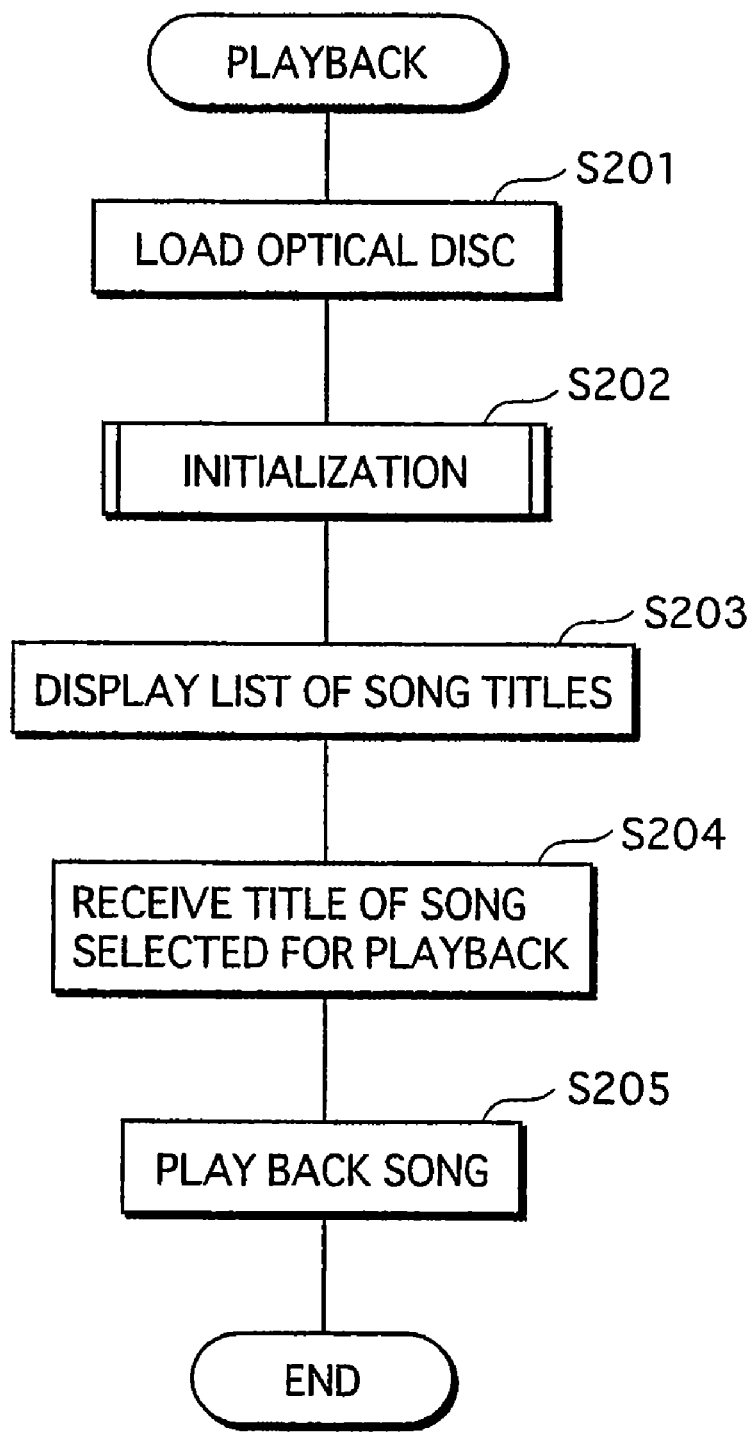
FIG. 4 shows a flowchart of processing steps performed by the playback device for playback of audio data stored on an optical disc.
Figure 5:
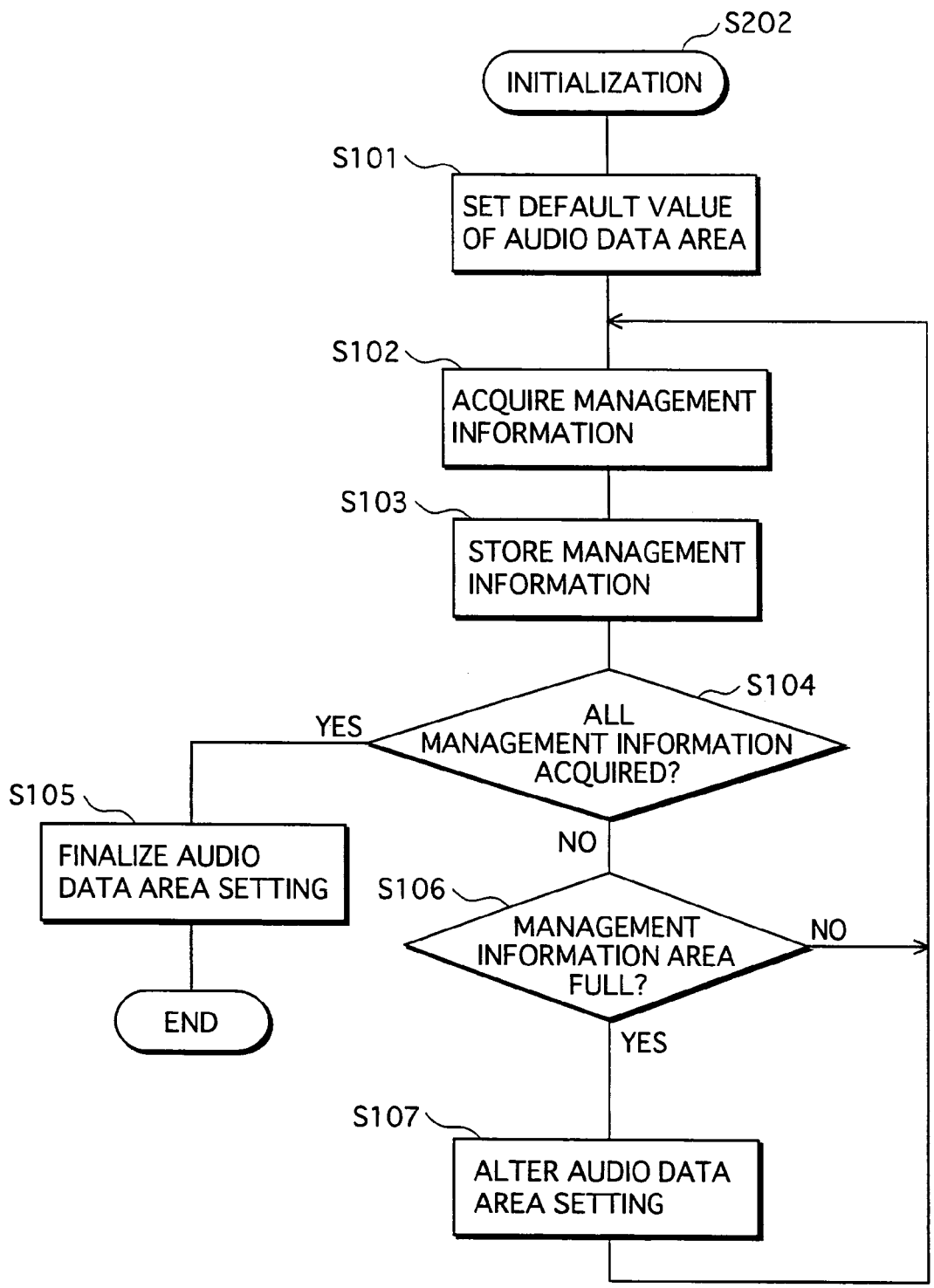
FIG. 5 shows a flowchart of initialization performed before audio data playback.

Now, a description is given to operations of the playback device 1000, with reference to flowcharts shown in FIGS. 4 and 5.

FIG. 4 shows a flowchart of processing steps performed by the playback device for playback of audio data stored on the optical disc.

First, a user loads the optical disc 1200 in the playback device 1000. Upon detecting the loading (step S201), the control unit 1100 performs initialization for playback of a song stored on the optical disc 1200 (step S202).

Specifically, through the initialization, the control unit 1100 reads information stored on the optical disc 1200 including the file name, with the disc read unit 1400. The control unit 1100 then generates the management information table 2000 and the file name data 3000 using the thus read information, and stores the management information table 2000 and the file name data 3000 to the disc information storage unit 1500. Details of the initialization are described with reference to FIGS. 5 and 6.

Next, the control unit 1100 displays a list of songs on the display 1800 (step S203). The song list is displayed based on the management information table 2000 and the file name data 3000 both stored in the management information area 1520 of the disc information storage unit 1500.

The user selects a song for playback from the song list presented on the display 1800. The selection may be made, for example, with a touch of an enter button after moving a cursor to a desired location. Instead of the selection by the user from the song list presented on the display 1800, the selection maybe made automatically so as to play back the songs sequentially from the file number "1".

The control unit 1100 acquires via the user operation unit 1300 the title of the song selected by the user for playback (step S204). In this embodiment, the control unit 1100 acquires the song number of the selected song. Note that the song numbers correspond to the file numbers shown in the file number column 2100 of the management information table 2000.

The control unit 1100 reads, via the disc read unit 1400, audio data stored on the optical disc 1200 at the storage location shown in association with the thus acquired file number. The control unit 1100 then writes the read audio data into the audio data area 1510 of the disc information storage unit 1500.

Then, the control unit 1100 issues a playback start instruction to the audio playback unit 1600.

Upon receipt of the instruction, the audio playback unit 1600 reads the audio data from the audio data area 1510, plays back the audio data via the audio output unit 1700 (step S205) During playback, the control unit 1100 sequentially reads, from the optical disc 1200, audio data that belongs to the song being played and sequentially writes the read the audio data into the audio data area 1510.

Next, a description is given to details of the initialization, with reference to FIGS. 5 and 6.

FIG. 5 shows a flowchart of the initialization performed before audio data playback.

Figure 6A:
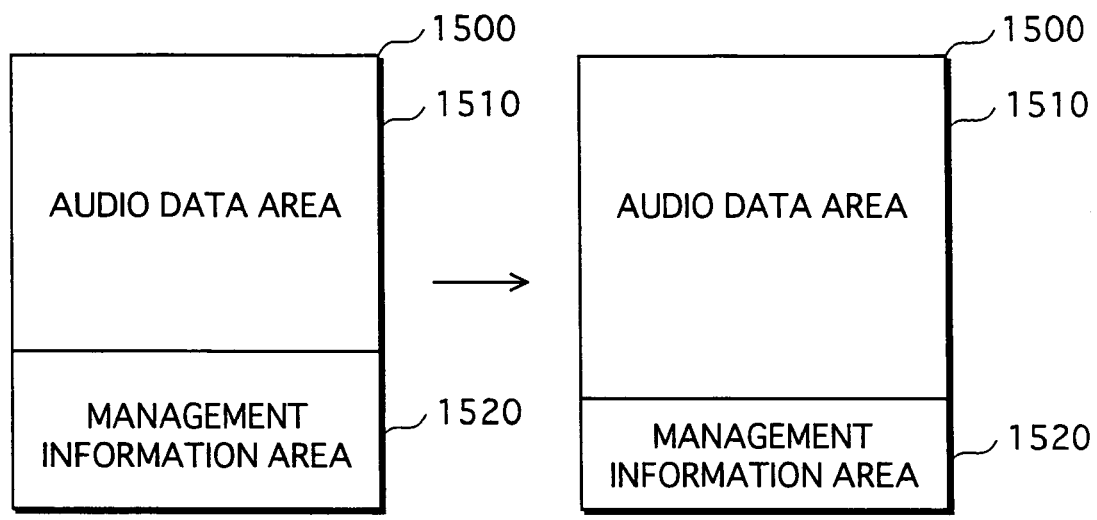
Figure 6B:
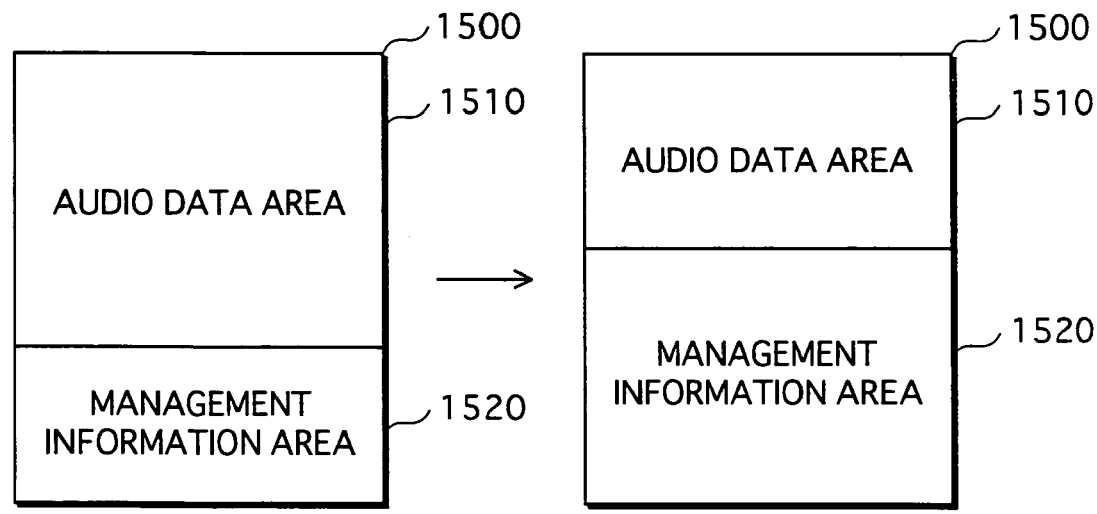
FIG. 6B shows an example in which the management information area 1520 is re-defined to be larger.

FIGS. 6 show examples of allocation of the disc information storage unit 1500 to the audio data area 1510 and the management information area 1520. FIG. 6A shows an example in which the management information area 1520 is re-defined to be smaller, whereas FIG. 6B shows an example in which the management information area 1520 is re-defined to be larger.

The control unit 1100 sets the default storage capacities of the disc information storage unit 1500 and the audio data area 1510 (step S101, left blocks of FIGS. 6A and 6B).

Next, the control unit 1100 acquires the management information from the optical disc 1200 via the disc read unit 1400 (step S102). The management information used herein refers to information to be stored into the management information area 1520. Note, in addition, that the information acquired in this step relates to a single file.

The control unit 1100 then stores the acquired management information into the management information area 1520 of the disc information storage unit 1500 (step S103). More specifically, of the acquired management information, the file name is stored to the file name area 1521 at a location contiguously following the end of the previously stored file name. The rest of the acquired management information is stored to a corresponding location of the file information area 1522. That is, the management information table 2000 and the file name data 3000 are written one after another to complete the table and the data.

Next, a judgment is made as to whether management information of all the files stored on the optical disc 1200 has already been acquired (step S104). If management information of all the files on the disc has been acquired (step S104: YES), the control unit 1100 re-defines every part of the management information area 1520 storing no information as an additional part of the audio data area 1510 (step S105), and completes the initialization. More specifically, the re-definition is carried out in the following manner, for example. With the use of the management information table 2000 having been completed, the control unit 1100 performs the following calculations. First, the entire size of the file name area 1521, which is variable, is calculated. Then, the calculated entire size is added to the size of the file information area 1522. The addition result is subtracted from the default storage capacity of the management information area 1520 determined through the initialization. Finally, the subtraction result is added to the default storage capacity of the audio data area 1510 and alters the capacity setting accordingly.

If the management information of all the files is not yet acquired (step S104: NO), the control unit 1100 judges whether the file information area 1522 is full (step S106).

If the file information area 1522 is not full yet (step S106: NO), the management information of a next file is acquired (step S102).

If the file information area 1522 is full (step S106: YES), the control unit 1100 re-define the audio data area 1510 to decrease the storage capacity as shown in the right block of FIG. 6B (step S107). Then, the management information of a next file is acquired (step S102).

Here, a description is given to examples of the layout of the audio data area 1510 and the management information area 1520 in the disc information storage unit 1500. In a first example, the audio data area 1510 is reserved at a location immediately preceding the management information area 1520. In this case, an address immediately following the end address of the audio data area 1510 serves as the start address of the management information area 1520. The present embodiment belongs to this example.

In a second example, the audio data area 1510 is reserved at a location immediately following the management information area 1520. In this case, an address immediately following the end address of the management information area 1520 serves as the start address of the audio data area 1510. The address management of a temporally storage unit described above can be readily carried out with the use of the management information table 2000 shown in FIG. 3A.

<Supplemental Note>

Up to this point, the playback device of the present invention has been described based on the above embodiment. Yet, the device may be modified partially. It is naturally appreciated that the present invention is not limited to the above specific embodiment and modifications including the following still fall within the scope of the present invention.

(1) In the above embodiment, the management information table 2000 is described to have a fixed size. Yet, the management information table 2000 may be variable in size.

Such a modification may be made for example in the case where the management information table 2000 is generated only for a predetermined number of files. In this case, it is necessary to make an arrangement for allowing the total number of files to be specified, by for example storing the total file number in advance.

Further, the length of the file name to be stored in the file name data 3000 is limited to 32 bytes at the maximum. It is naturally appreciated, however, that the value is merely an example. It is also applicable to set no limit to the file name length.

Further, it is applicable to set, for each optical disc, a different maximum length of a file name to be stored in the file name data 3000. In this case, it is further applicable to allow the user to set the maximum length.

(2) In the above embodiment, the file names of audio data are managed as variable-length data. Yet, it is applicable to manage other data as variable-length data.

In the above embodiment, the file information area is automatically optimized in view of the fact that the file names in the file management information are memory consuming data. A memory area made available as a result of the optimization is automatically added to the audio data area. Thus, the audio data storage area is effectively reserved.

In addition, the data management method of the present invention is applicable not only to data read from an optical disc or the like loaded in a playback device. The data management method is also applicable to data read from any other recording medium or from a network.

(3) In the above embodiment, the audio data area and management information area are re-defined after the management information of all the files are acquired from an optical disc. Yet, the re-definition of the areas may be done in another way.

For example, a threshold of a permitted amount of management information is stored in advance. The management information of files is read piece by piece so as not to store the management information after the threshold is exceeded. With this modification, a certain size of audio data area is reserved, so that a certain level of audio playback performance is ensured.

In this case, the management information is sequentially written piece by piece. If the threshold is not exceeded even after all the management information of all the files has been written, the total size of the management information is determined as the storage capacity of the management information area. If the threshold is exceeded, the threshold is determined as the storage capacity of the management information area.

For example, the threshold may be so determined that the audio data area occupies at least 60% of the entire memory.

(4) In the above embodiment, all the necessary information is read from the disc and used to generate data to be stored in the management information area 1520 regardless of, for example, the amount of the management information table 2000. Yet, it is applicable to limit the management information to a specific amount. It is also applicable to partially omit the read information in generating data to be stored in the management information area 1520.

For example, the minimum storage capacity is set for the audio data area 1510 in the disc information storage unit 1500. In the case where the audio data area calculated from the management information table 2000 shown in FIG. 3A is smaller than the minimum storage capacity, acquisition of file information is made to stop. With this arrangement, the audio data area is reserved with an enough storage capacity to ensure seamless audio playback.

(5) In the above embodiment, the management information table 2000 is stored in the file information area 1522. Yet, the management information table 2000 may be stored in another memory within the playback device 1000.

Examples of such a memory include the internal memory of the control unit 1100.

(6) According to the above embodiment, the management information table 2000 is used for managing the file names of audio data. Yet, information other than the file names may be managed.

For example, in the case where the files on an optical disc are managed by directories, the management information table 2000 may be generated so as to also manage the directory names.

(7) A program for causing a CPU to execute the control processing for implementing each function of the playback device (see FIG. 1, for example) maybe distributed in form of a recording medium storing such a program or over a various types of communications lines. Examples of such recording media include IC card, optical disc, flexible disk, ROM, and flash memory. Each program distributed may be stored to a memory readable by CPUs on a device. When executed by such a CPU, the program realizes the functions of the playback device described in the above embodiment.

<Comparative Study with Conventional Playback Technique>

The following considers advantages of the present invention over a conventional audio playback device, with reference to FIGS. 7-12.

In addition to an audio data playback function, conventional audio playback devices, especially the ones for optical discs, are provided with a function of displaying management information including the file names of the audio data. It is desired that a playback device be capable of seamlessly playing back audio data read from a recording medium such as an optical disc, even during the time when data read can not be performed due to shock or vibration.

In order to ensure the above capabilities, an optical disc playback device is provided with a storage unit. Audio data and management information read from an optical disc are temporarily stored to the storage unit and supplied for playback from the storage unit, rather than directory from the optical disc.

The following describes a technique for playing back audio data recorded on an optical disc and a technique for realizing the above described capabilities.

FIG. 7 is a block diagram of a conventional optical disc playback device.

With reference to FIG. 7, in order to read audio data and the like, an optical disc 1 is irradiated with a laser. Light reflected off the optical disc 1 reaches an optical pickup 3 via a lens 2.

The optical pickup 3 converts the reflected laser light into an electric signal, and a head amplifier 4 amplifies the resulting electric signal to generate an RF signal, a focus error signal, and a tracking error signal.

The focus error signal is used for focus servo, and the tracking error signal is used for tracking servo.

The two error signals are supplied to a servo LSI 5. The servo LSI 5 carries out the focus servo based on the focus error signal, amplifies a control signal via a driver 7, and controls the operation of the lens 2 or the optical pickup 3.

In addition, the servo LSI 5 carries out tracking servo and transverse servo based on the tracking error signal, amplifies a control signal via the driver 7, and controls the operation of the optical pickup 3 to carry out tracking control. Finally, the servo LSI 5 carries out CLV (Constant Linear Velocity) servo based on a synchronous signal. The synchronous signal is generated from the RF, focus error, and tracking signals generated by the head amplifier 4. As a result, the servo LSI 5 controls the rotation speed of a spindle motor 8.

On the other hand, the RF signal generated by the head amplifier 4 is demodulated by a signal processing circuit 6 into a binary signal. The binary signal is then digital-to-analog converted by a DF-DAC (Digital Filter-Digital Analog Converter) circuit 11, and output to an audio output unit 9 as an analog audio signal.

In addition, a memory 10 is provided to prevent interruption of audio playback due to shock or vibration of the optical disc playback device. Prior to the digital-to-analog conversion of the signal by the DF-DAC circuit 11 and output of the resulting analog signal to the audio output unit 9, the binary signal demodulated by the signal processing signal is temporarily stored to the memory 10. The DF-DAC circuit 11 digital-to-analog coverts the binary signal temporarily stored in the memory, and outputs the resulting analog audio signal to the audio output unit 9.

With this arrangement, even during the time no data is read from the optical disc owing to shock or vibration, seamless audio playback is ensured since the signal stored in advance to the memory 10 is supplied for playback.

As is commonly known, there are various format standards for optical discs. Next, with reference to FIG. 7, a description is given to an example of playback of a CD-DA (Compact Disc-Digital Audio) formatted disc and of a CD-ROM formatted disc.

Figure 8:
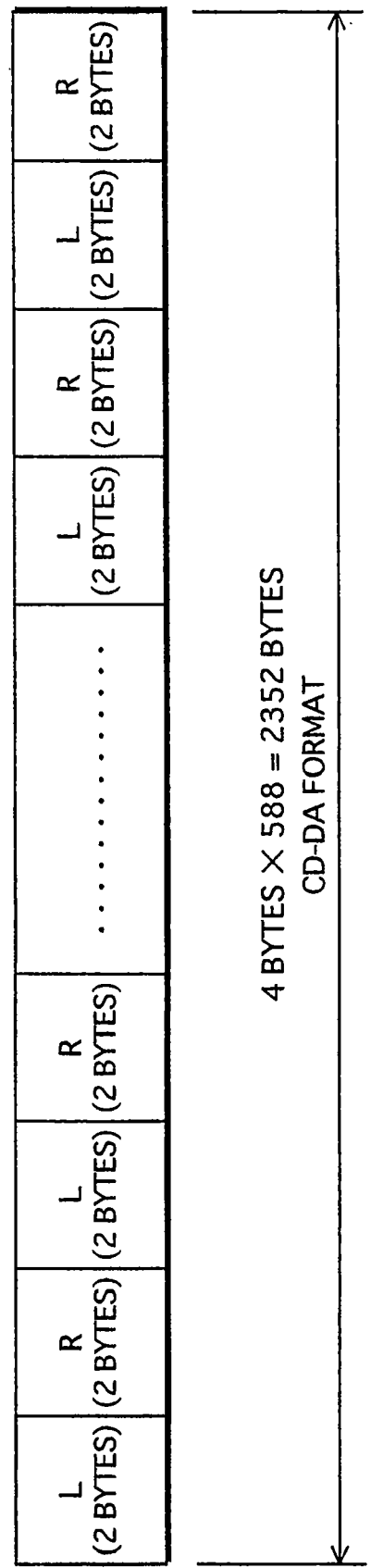
FIG. 8 shows a CD-DA format.

FIG. 8 shows the CD-DA format.

As shown in FIG. 8, a plurality of 2-byte samples for left and right channels are alternately recorded on the CD-DA formatted disc and each block is composed of 2,352 bytes of audio data. In this example, the memory 10 accumulates audio data (music data and the like) only. The audio data accumulated in the memory 10 is digital-to-analog converted by the DF-DAC circuit 11 and output to the audio output unit 9 as an analog audio signal.

Figure 9:
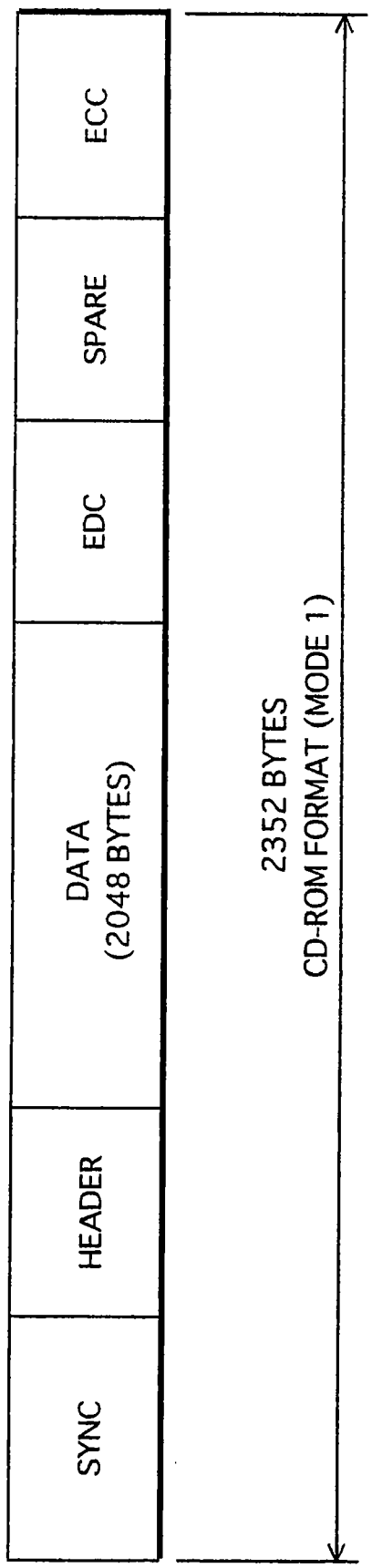
FIG. 9 shows a CD-ROM format.

FIG. 9 shows the CD-ROM format.

In the case where the optical disc 1 is a CD-ROM disc, data is stored in the format shown in FIG. 9. According to the CD-ROM disc format shown in FIG. 9, the data contains SYNC (synchronous) segments and header segments. In addition, ECC (error correction code) is contained to enable a robust error correction.

Further, the ISO 9660 standard stipulates the data storage of CD-ROM format. In compliance with the ISO 9660 standard, file names and folder names may consist only of a predetermined number of characters including upper-case letters (A-Z), numerals (0-9), and the underscore (). The audio data (music data) is accumulated in the memory 10 and decoded by a decoder 12, and digital-to-analog converted by the DF-DAC circuit 11, and finally output as analog audio.

Next, a description is given to reading of character information such as a file name from a CD-ROM and a display of the read character information.

Figure 10:
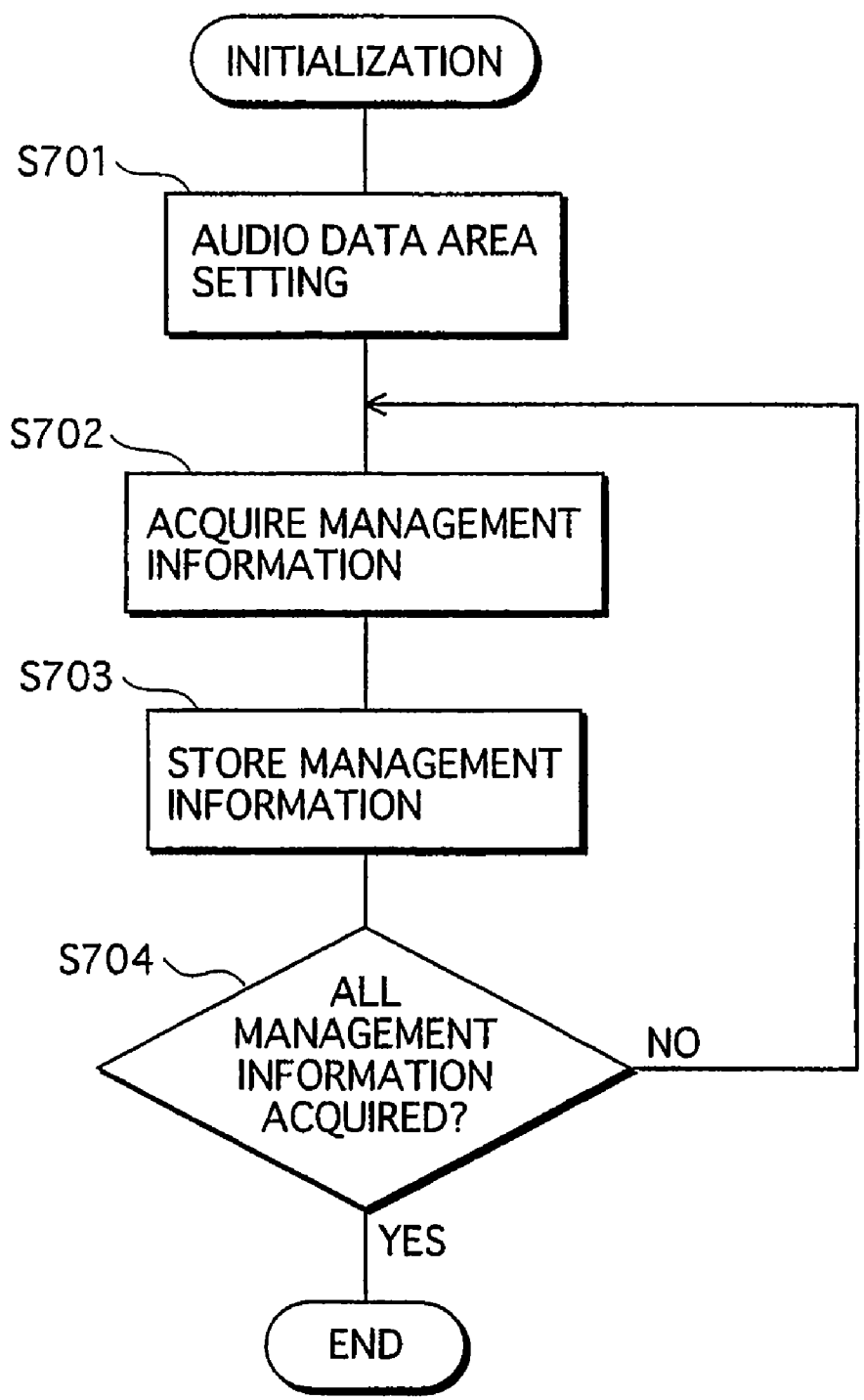
FIG. 10 shows a flowchart of processing steps of file information storage (initial processing), performed by a conventional optical disc playback device which is provided with temporary storage unit.

FIG. 10 shows a flowchart of processing steps of file information storage (initial processing), performed by a conventional optical disc playback device which is provided with temporary storage unit.

First, when initiating a read from the optical disc 1, the playback device reserves an audio data area in the memory 10 (step S701). Prior to audio output, audio data is temporarily stored to the audio data area in order to prevent interruption of audio output.

The playback device then acquires management information from the optical disc 1 (step S702), and stores the acquired management information to the memory 10 (step S703). When management information of all the files stored on the optical disc 1 is acquired, the initialization is terminated and moves onto playback (step S704: YES).

If management information of all the files is not yet acquired (step S704: NO), management information of a next file is acquitted.

Figure 11:
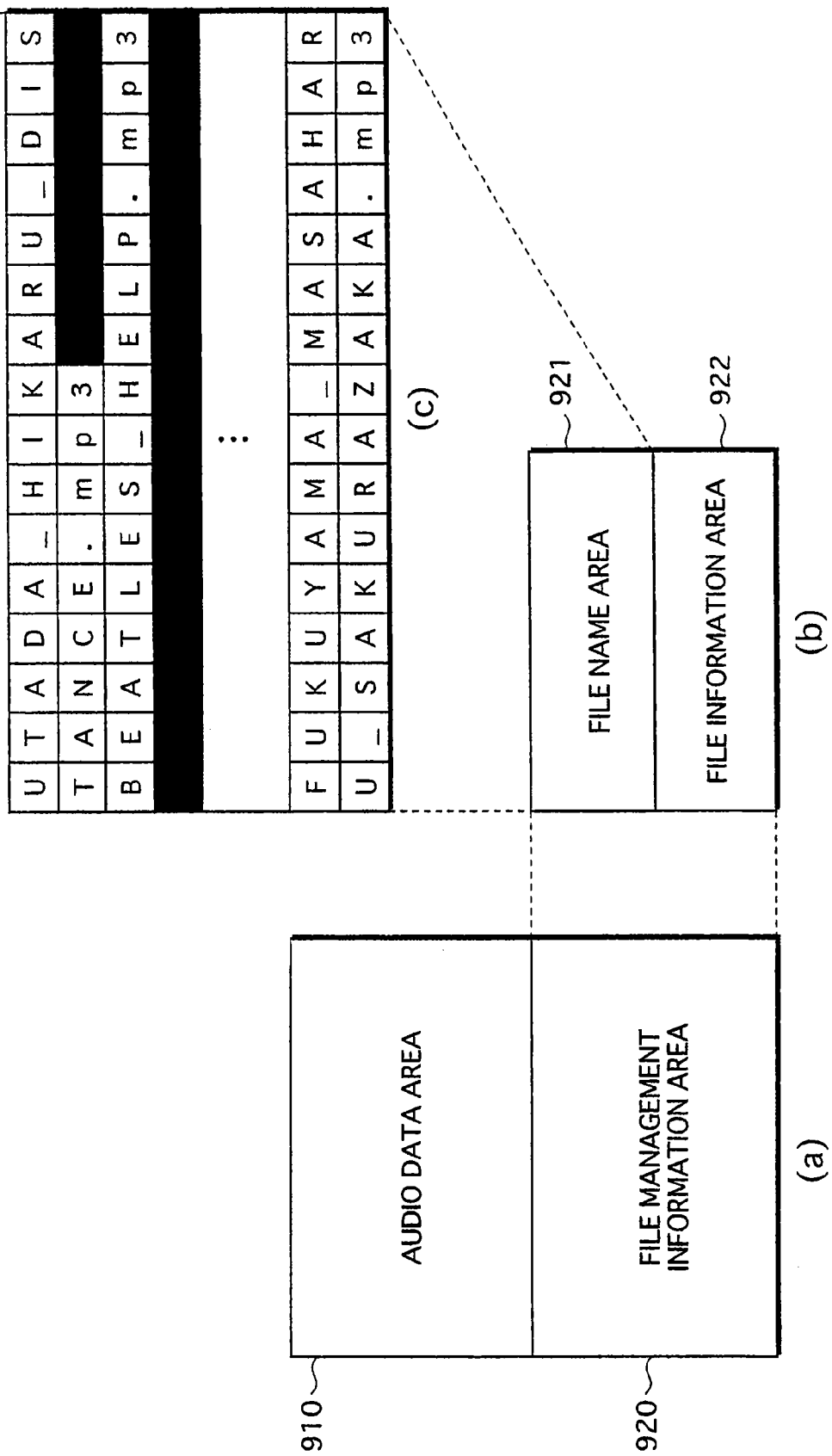
FIG. 11 shows an example structure of a memory 10.

FIG. 11 shows an example structure of the memory 10.

As shown in the block (a) of FIG. 11, the storage area of the memory 10 is partitioned into an audio data area 910 and a file management information area 920. The audio data area 910 is used for temporarily storing audio data. The file management information area 920 is used for storing management information of all the files stored on the optical disc 1.

Here, a description is given to processing performed for acquiring file management information, with reference to the contents of the file management information stored on the memory 10.

As shown in the block (b) of FIG. 11, the file management information area 920 is composed of a file name area 921 for storing file names and a file information area 922 for storing file management information other than the file names (start and end addresses of audio data).

The file name area 921 stores the contents shown in the block (c) of FIG. 11. As shown in the block (c) of FIG. 11, the file name area 921 is normally defined to store fixed-length file names (32 bytes, for example).

The optical disc playback device disclosed in JP patent application publication No. 2003-15963 cited above stores a file name to a storage unit and also manages the size of the file name. The size of the file name is used to check whether the stored file name (referred to as "file information" in the publication) is valid or not.

Figure 12A:
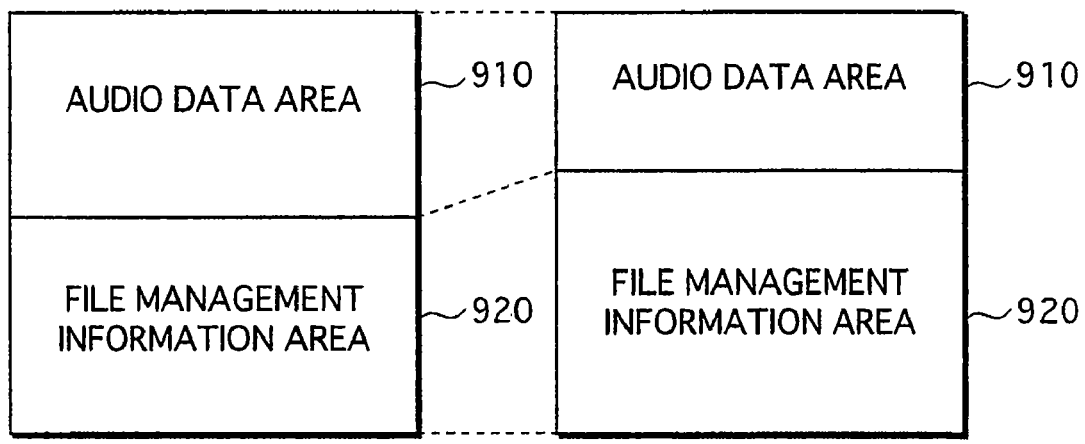
FIG. 12A shows an example in which the memory 10 is partitioned without changing the memory capacity.
Figure 12B:
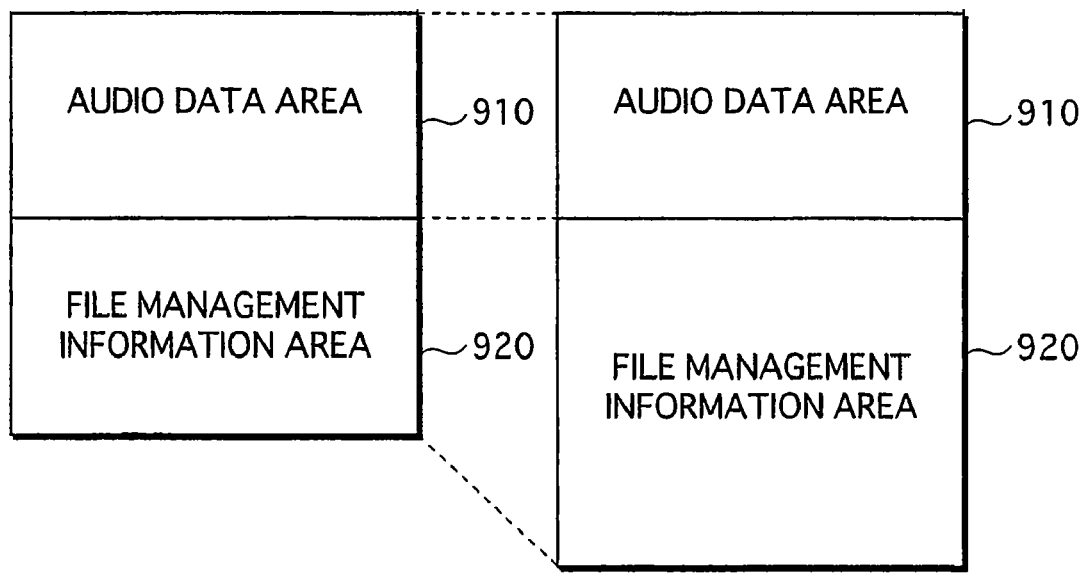
FIG. 12B shows an example in which the memory 10 is partitioned after increasing the memory capacity.

FIGS. 12 show examples of partition of the memory 10. FIG. 12A shows an example in which the memory 10 is partitioned without changing the memory capacity. FIG. 12B shows an example in which the memory 10 is partitioned after increasing the memory capacity.

As shown in FIG. 12A, when the file management information area 920 is increased in capacity without changing the capacity of the memory 10, the audio data area 910 inevitably decreases. Even during the time the optical pickup is unable to read any data from the optical disc due to the shaking of the optical disc playback device, seamless audio playback is ensured because data read and stored in advance to the audio data area is supplied for playback.

That is, the size of the audio data area determines how long seamless audio playback is possible without data read by the optical pickup 3. Thus, the reduction in size of the audio data area makes the playback device more vulnerable to shock or vibration.

Yet, when the memory 10 is increased in capacity in order to avoid decreasing the audio data area 910, as shown in FIG. 12B, the manufacturing cost inevitably increases.

With the optical disc playback device employing the memory usage according to the present invention, the management information area is automatically optimized, and an area made available by the optimization is automatically added to the audio data area. Thus, the audio data area is efficiently reserved. As a result, the ability to withstand shaking of the playback device is maintained or even improved without increasing the memory capacity. In addition, since increase of the memory capacity is not required, there is no increase in cost either.

Especially notable is that it is conventionally impossible to flexibly deal with the cases where a file name is extremely shorter or slightly longer than what can be expressed with the number of bytes specified as a fixed-length. According to the present invention, however, the size of area used to store file names is variable in accordance with the size of the file names. Thus, the entire memory consumption is significantly reduced.

In addition, in a conventional practice, file names are stored as fixed-length data. Thus, it is required to fetch a fixed-length of data to read a file name, which involves waste. According to the present invention, however, each file name is stored as variable-length data along with the length of the file name. Thus, each file name is read at a higher speed, since the length of data that needs to be fetched is the actual length of the file name.

INDUSTRIAL APPLICABILITY

The present invention is applicable to any playback device that temporarily stores data and supplies the temporarily stored data for playback. The playback device to which the present invention is applied is especially usable to reduce the cost in a manner suitable to its use environment.

The invention claimed is:

1. A data storage method for reading, from a recording medium, a plurality of pieces of audio data for execution of playback by a playback device, with a plurality of pieces of management information each corresponding to one of the pieces of audio data, and storing the read pieces of audio data into a storage unit of the playback device, the storage unit having a management information area for storing management information and an audio data area for storing audio data, the method sequentially comprising:

a default setting step of setting a capacity of the audio data area by a control unit of the playback device, a management information storing step of sequentially storing pieces of read management information and storing specifying information specifying a storage location of each of the pieces of read management information into the management information area of the storage unit;

a re-setting step of decreasing the capacity of the audio data area if the management information area becomes full before all pieces of read management information are stored; and an audio data storing step of storing the pieces of read audio data into the audio data area having the capacity effective upon completion of the reading of management information from the recording medium, wherein data space available for each piece of management information stored in the management information area of the storage unit is variable according to an amount of information included in each piece of management information.

2. The data storage method according to claim 1, wherein the management information storing step and the re-setting step are repeated until the reading of management information from the recording medium ends.

3. The data storage method according to claim 1, wherein the pieces of read management information are recorded starting from a starting address of the storage unit, and the pieces of read audio data are recorded starting from an address contiguous to an end address of the pieces of management information on the storage unit.

4. The data storage method according to claim 1, wherein the pieces of read audio data are recorded starting from a starting address of the storage unit, and the pieces of read management information are recorded starting from an address contiguous to an end address of the pieces of audio data on the storage unit.

5. The data storage method according to claim 1, wherein each piece of management information indicates a file name of a corresponding piece of audio data.

6. The data storage method according to claim 1, wherein the plurality of pieces of audio data are compressed using a predetermined compression format.

7. The data storage method according to claim 1, wherein the recording medium is an optical disc medium.

8. The data storage method according to claim 1, wherein in the re-setting step, the capacity of the audio data area is decreased to a size larger than a predetermined capacity.

9. The data storage method according to claim 1, wherein the audio area is set to be an area of the storage unit other than an area used to store pieces of management information at a time when the reading of management information from the recording medium completes.

10. The data storage method according to claim 1, further comprising:

a minimum setting step of setting a minimum capacity of the audio data area, wherein if the capacity of the audio data area after the decrease to be performed in the re-setting step is calculated to be a size smaller than the minimum capacity, the reading of management information is ended so that no more pieces of management information is read from the recording medium.

11. The data storage method according to claim 1, wherein the specifying information includes a length and a start address of each of the pieces of read management information.

12. A data storage method for reading, from a recording medium, a plurality of pieces of audio data for execution of playback by a playback device, with a plurality of pieces of management information each corresponding to one of the pieces of audio data, and storing the read pieces of audio data into a storage unit of the playback device, the storage unit having a management information area for storing management information and an audio data area for storing audio data, the method sequentially comprising:
  a default setting step of setting a capacity of the audio data area by a control unit of the playback device,
  a management information storing step of sequentially storing pieces of read management information and storing specifying information specifying a storage location of each of the pieces of read management information into the management information area of the storage unit;
  a re-setting step of increasing the capacity of the audio data area by re-defining each part of the management information area storing no management information as an additional part of the audio data area if all pieces of read management information are stored; and
  an audio data storing step of storing the pieces of read audio data into the audio data area having the capacity effective upon completion of the reading of management information from the recording medium,
  wherein data space available for each piece of management information stored in the management information area of the storage unit is variable according to an amount of information included in each piece of management information.

13. The data storage method according to claim 12, wherein
  the specifying information includes a length and a start address of each of the pieces of read management information.

14. The data storage method according to claim 12, wherein
  the pieces of read management information are recorded starting from a starting address of the storage unit, and
  the pieces of read audio data are recorded starting from an address contiguous to an end address of the pieces of management information on the storage unit.

15. The data storage method according to claim 12, wherein
  the pieces of read audio data are recorded starting from a starting address of the storage unit, and
  the pieces of read management information are recorded starting from an address contiguous to an end address of the pieces of audio data on the storage unit.

16. The data storage method according to claim 12, wherein
  each piece of management information indicates a file name of a corresponding piece of audio data.

17. The data storage method according to claim 12, wherein
  the plurality of pieces of audio data are compressed using a predetermined compression format.

18. The data storage method according to claim 12, wherein
  the recording medium is an optical disc medium.

* * * * *